(12) United States Patent
Kobayashi et al.

(10) Patent No.: US 11,267,433 B2
(45) Date of Patent: Mar. 8, 2022

(54) SIDE AIRBAG DEVICE AND VEHICLE SEAT PROVIDED WITH SAME

(71) Applicant: Autoliv Development AB, Vargarda (SE)

(72) Inventors: Yuto Kobayashi, Kanagawa (JP); Tsutomu Sakurai, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 17/252,325

(22) PCT Filed: May 8, 2019

(86) PCT No.: PCT/JP2019/018462
§ 371 (c)(1),
(2) Date: Dec. 15, 2020

(87) PCT Pub. No.: WO2019/244493
PCT Pub. Date: Dec. 26, 2019

(65) Prior Publication Data
US 2021/0261086 A1 Aug. 26, 2021

(30) Foreign Application Priority Data

Jun. 19, 2018 (JP) .............................. JP2018-116479

(51) Int. Cl.
| B60R 21/233 | (2006.01) |
| B60R 21/207 | (2006.01) |
| B60R 21/231 | (2011.01) |
| B60R 21/239 | (2006.01) |
| B60R 21/00  | (2006.01) |

(52) U.S. Cl.
CPC .......... *B60R 21/233* (2013.01); *B60R 21/207* (2013.01); *B60R 21/239* (2013.01); *B60R 21/23138* (2013.01); *B60R 2021/0006* (2013.01)

(58) Field of Classification Search
None
See application file for complete search history.

(56) References Cited

U.S. PATENT DOCUMENTS 10,857,964 B2 * 12/2020 Kobayashi ............ B60R 21/207
11,077,815 B2 *  8/2021 Fukawatase .......... B60R 21/207
2019/0217807 A1 *  7/2019 Kobayashi ............ B60R 21/233
(Continued)

FOREIGN PATENT DOCUMENTS

| EP | 3290276 B1 * | 4/2019 | ........... B60R 21/207 |
| EP | 3511210 A1 * | 7/2019 | ........... B60R 21/239 |

(Continued)

*Primary Examiner* — Faye M Fleming
(74) *Attorney, Agent, or Firm* — Harness, Dickey & Pierce, P.L.C.; Stephen T. Olson

(57) ABSTRACT

The airbag is provided with a main chamber that deploys toward the front of the vehicle and a pre-chamber that houses the inflator and begins to deploy ahead of the main chamber in the vehicle width direction to the inside of the main chamber. Here, the main chamber is demarcated into a front region and a rear region by a demarcation. The boundary area between the main chamber and the pre-chamber is provided with a front vent that directs the expanding gas from the pre-chamber to the pre-chamber front area and a rear vent that directs the gas to the rear region.

14 Claims, 13 Drawing Sheets

(56) References Cited

U.S. PATENT DOCUMENTS

| | | | | |
|---|---|---|---|---|
| 2020/0346604 A1* | 11/2020 | Kobayashi | ............ | B60R 21/207 |
| 2021/0046895 A1* | 2/2021 | Kobayashi | ............. | B60N 2/986 |
| 2021/0129787 A1* | 5/2021 | Kobayashi | .......... | B60R 21/2346 |
| 2021/0162942 A1* | 6/2021 | Kobayashi | ............ | B60R 21/233 |

FOREIGN PATENT DOCUMENTS

| | | | | |
|---|---|---|---|---|
| EP | 3517371 A1 * | 7/2019 | ........... | B60R 21/233 |
| JP | 42001/1993 | 6/1993 | | |
| JP | 2007-176347 A | 7/2007 | | |
| JP | 2008-120148 A | 5/2008 | | |
| JP | 2009-23494 A | 2/2009 | | |
| JP | 2016-78507 A | 5/2016 | | |
| WO | 2017/209192 A1 | 12/2017 | | |
| WO | WO-2020129386 A1 * | 6/2020 | ........... | B60R 21/237 |

\* cited by examiner

[FIG. 1]
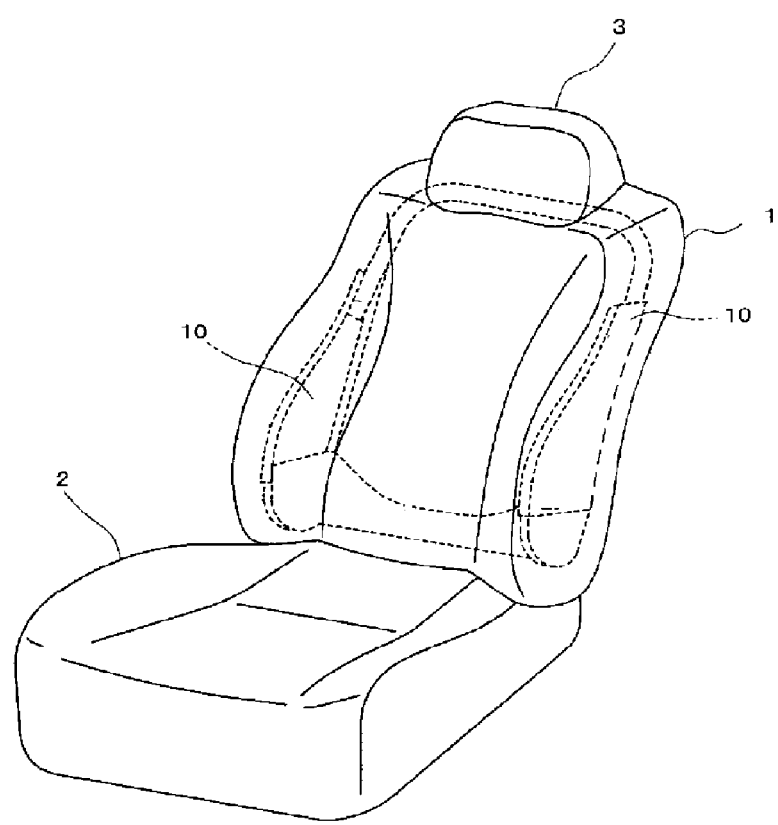

[FIG. 2]
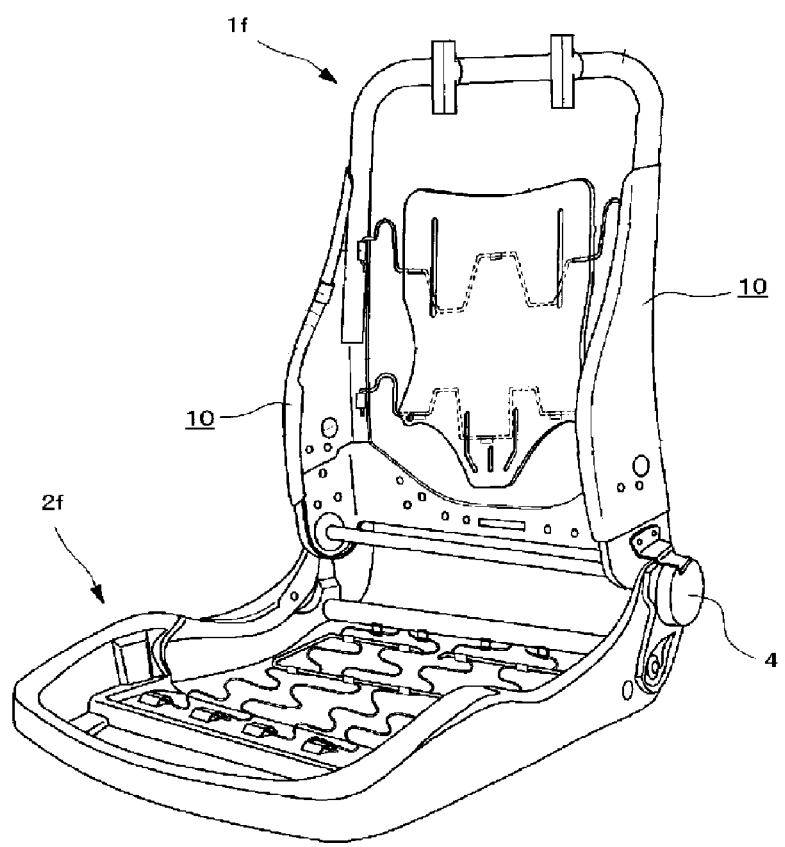

[FIG. 3]
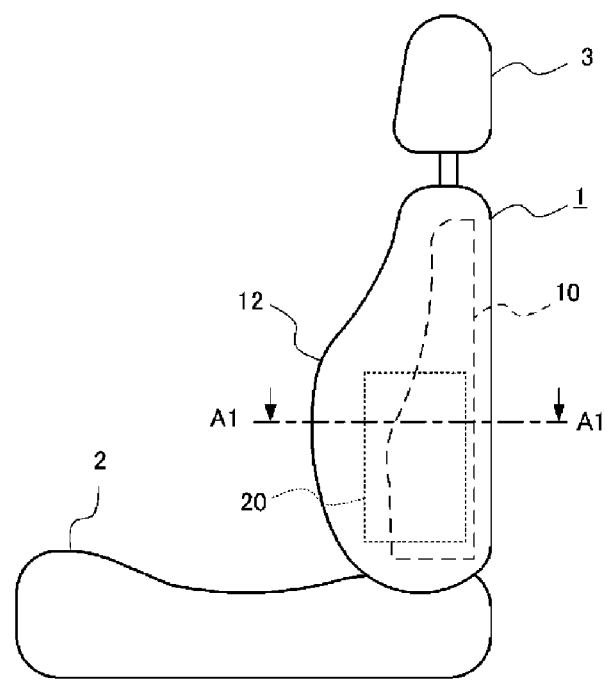
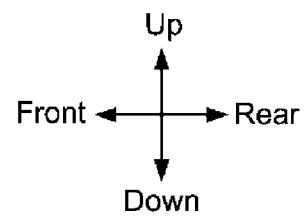

[FIG. 4]
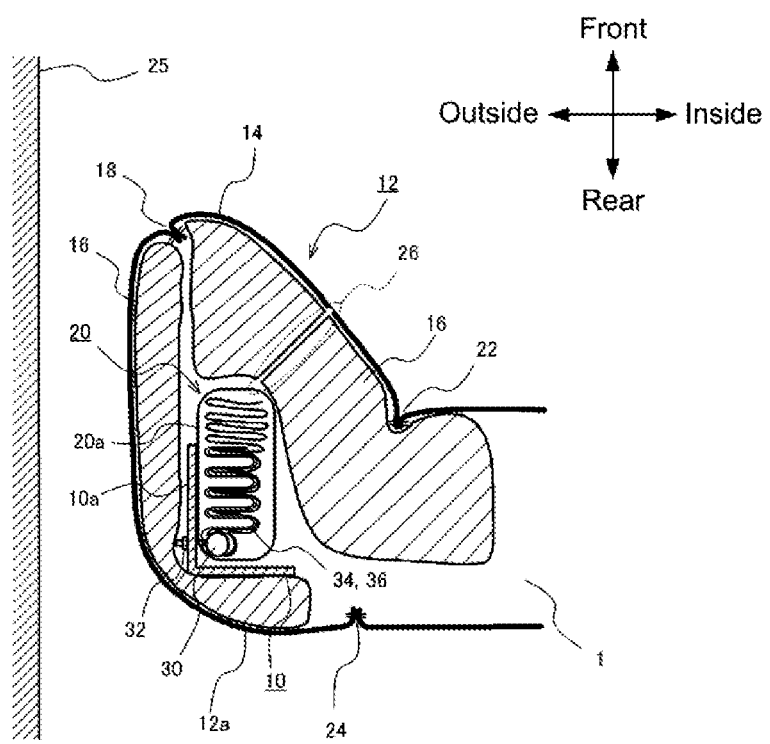
A1-A1 cross section

A3-A3 cross section

A2-A2 cross section

A1-A1 cross section

[FIG. 7]
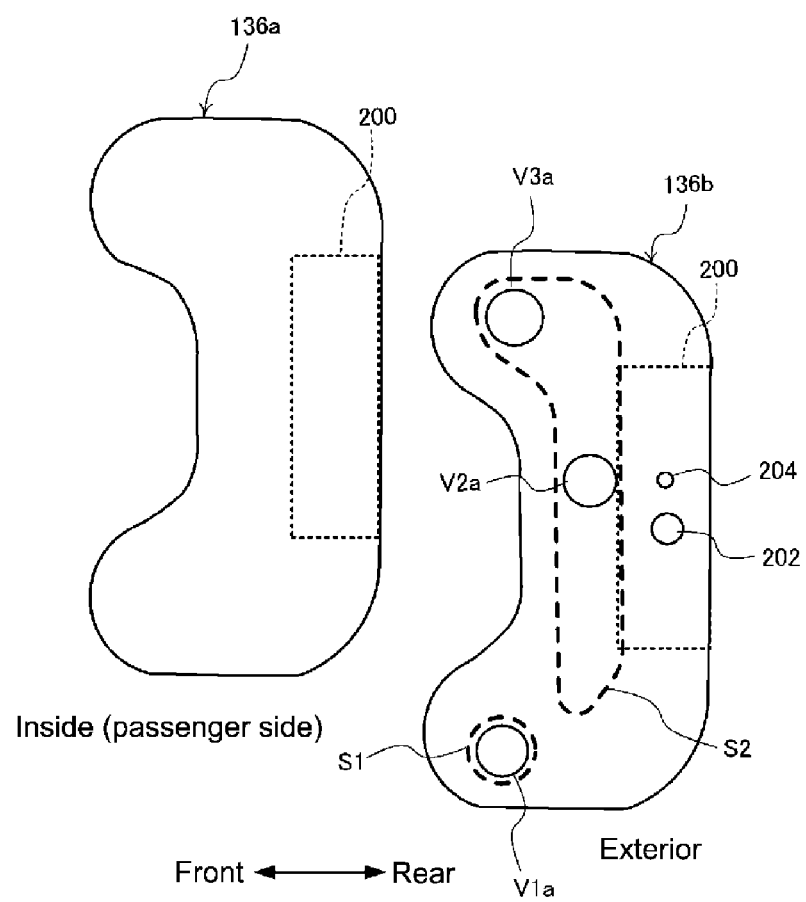

[FIG. 11]
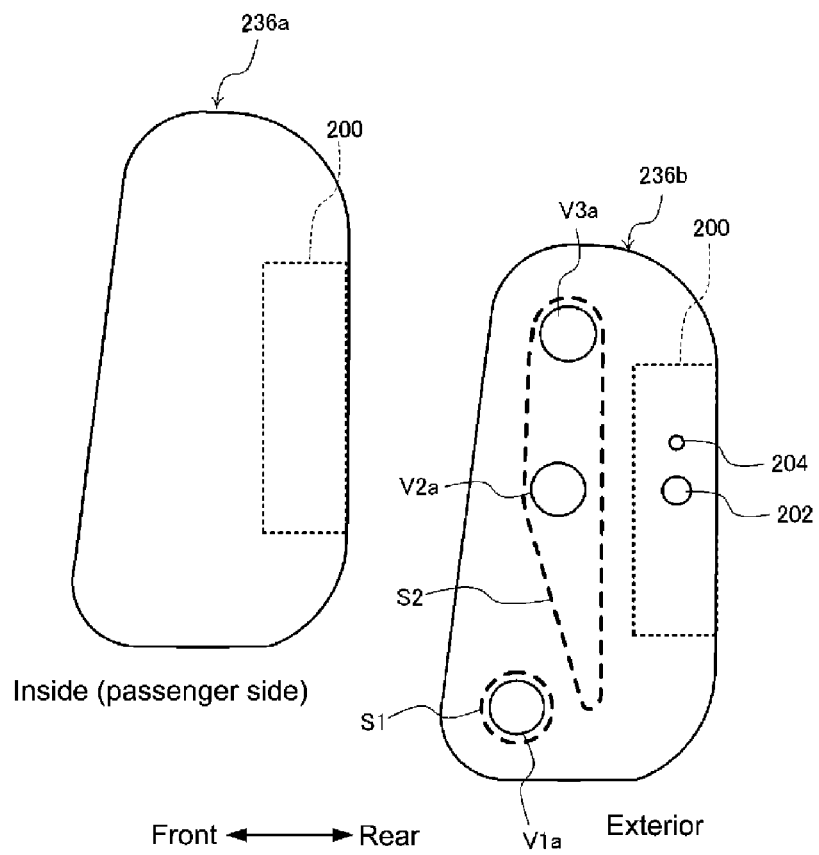

SIDE AIRBAG DEVICE AND VEHICLE SEAT PROVIDED WITH SAME

TECHNICAL FIELD

The present invention relates to a side airbag device and a vehicle seat provided therewith. In particular, improvements to side airbag devices with a pre-chamber that deploy to the inside (occupant side) of the main chamber.

BACKGROUND

In order to protect passengers in the event of a vehicle accident, it is well known that vehicles are equipped with one or more airbags. These airbags include, for example, various forms such as: a so-called driver airbag which expands from near the center of the steering wheel of an automobile so as to protect a driver; a curtain airbag which deploys downward along an inner side of a window of the automobile so as to protect passengers during collisions in a transverse direction of the vehicle, as well as when overturning and during rollover accidents; and a side airbag which is deployed between the passenger and a side panel so as to protect the passenger upon impact in the transverse direction of the vehicle. The present invention relates to a side airbag device and a vehicle seat provided with same.

The side airbag device described in Patent Reference 1 below is provided with a main airbag that mainly restrains the occupant, and an auxiliary airbag separate from the main airbag. In addition, prior to the main airbag, the auxiliary airbag is expanded and deployed to restrain occupants at an early stage. For these side airbag devices, there is a strong demand for a more compact device due to significant installation area limitations.

Moreover, there is a demand for appropriate passenger protection performance due to improved deployment speed and stabilization of the deployed shape.

RELATED ART DOCUMENTS

Patent Documents

Patent Reference 1: Japanese Unexamined Patent Application Publication No. 2009-023494

SUMMARY OF THE INVENTION

Problem to be Solved by the Invention

In view of the foregoing, an object of the present invention is to provide: a side airbag device capable of quickly and properly restraining an occupant; and a vehicle seat provided therewith.

Furthermore, another object is to provide: a side airbag device that contributes to downsizing of the device; and a vehicle seat provided therewith.

Means for Solving the Problem

In the specification, claims, and drawings, the directions shall be defined as follows. When an occupant is seated in a normal seating posture such that a large portion of the back of the occupant contacts the seat back, the direction that the torso of the occupant faces shall be referred to as "front", and an opposite direction thereof shall be referred to as "rear". Furthermore, a right-hand direction of the occupant shall be referred to as "right", and a left-hand direction shall be referred to as "left", which are directions orthogonal to the front-rear direction. In the left-right direction, a region on an occupant side from a side frame of the seat shall be referred to as "inside", and a region opposite from the occupant as viewed from the side frame shall be referred to as "outside".

The present invention is applied to a side airbag device including an inflator that generates expansion gas and an airbag deployed from a side portion of the vehicle seat by the expanding gas to protect an occupant. In order to achieve the objects described above, the airbag is provided with a main chamber that deploys toward the front of the vehicle and a pre-chamber that houses the inflator and begins to deploy prior to the main chamber to the inside of the main chamber in the vehicle width direction. Here, the main chamber is demarcated into a front region and a rear region by demarcations. The boundary area between the main chamber and the pre-chamber is provided with a front vent that directs the expanding gas from the pre-chamber to the forward region of the main chamber and a rear vent that directs the gas to the rear region.

According to the present invention in the configuration described above, in the initial stage of activation of the side airbag device, the pre-chamber begins to deploy first, and the occupant is quickly restrained from moving outward in the vehicle width direction. Here, the pre-chamber pushes the occupant toward the inside in the vehicle width direction, suppressing a force that pushes the occupant diagonally forward from the back direction from occurring. In other words, deployment of the airbag prevents the occupant from being pushed in the direction that the seatbelt can be pulled out (in the direction of travel), allowing maximum restraint performance while minimizing harm to the occupant.

The pre-chamber can be provided to cover at least some of the partitioned portions of the main chamber when viewed from the side of the vehicle.

The lower portion of the pre-chamber can form a downward protruding part that protrudes toward the front of the vehicle when viewed from the side of the vehicle and is positioned more to the rear side of the vehicle than the front end portion of the main chamber.

The upper portion of the pre-chamber can form an upward protruding part that protrudes toward the front of the vehicle when viewed from the side of the vehicle and is positioned more to the rear side of the vehicle than the front end portion of the main chamber.

By providing an upward protruding part in the pre-chamber, the upward protruding part is positioned near the head of the occupant when the airbag is deployed, and the head, which is prone to injury, can be quickly restrained. In addition, by providing the pre-chamber with a downward protruding part, when the airbag is deployed, the downward protruding part is positioned near the waist of the occupant and presses on the waist near the center of gravity of the human body, thereby improving occupant restraint performance in the initial stages of an accident.

Regarding the present invention, forming rear vents in at least two locations is preferable. As the rear region of the main chamber is positioned close to the inflator stowed in the pre-chamber, a plurality of rear vents, rather than one, allows the expanding gas to be quickly delivered into the main chamber. As a result, the main chamber can be expanded and deployed quickly.

The rear vent can be formed above the middle part of the pre-chamber in the height direction (or vertical direction). When the side airbag device is activated, occupant movement in the lateral direction (in the width direction of the vehicle) is quickly restrained by the deployment of the pre-chamber. Here, if the rear vents are positioned to the upward side, the upper part of the main chamber, which is positioned near the head of the occupant, can be deployed earlier and the head of the occupant can be restrained quickly. In other words, injuries to the head and neck of the occupant can be minimized.

The front vent is preferably formed below the middle portion of the pre-chamber in the height direction (or vertical direction). By placing the rear vent to the upward side and the front vent to the downward side, the main chamber as a whole can be deployed quickly and in a balanced manner.

Regarding the main chamber, the boundary between the forward region and the rear region can be demarcated by a baffle plate. In addition, the baffle plate is preferably provided with a baffle vent that enables communication of fluid between the forward region and rear region. If the configuration is set in a manner where gas flows between the forward and rear regions of the main chamber, the gas will flow from the pre-chamber to the forward and rear regions of the main chamber, as well as from the rear region of the main chamber to the forward region. Therefore, the entire main chamber (especially the forward region) can be deployed more quickly.

A rectifying member can be further provided that surrounds the inflator inside the pre-chamber and regulates the flow of the expanding gas. By means of a rectifying member, for example, if the structure is provided with openings at the upper and lower end parts of the rectifying member that guide the expanding gas released from the inflator in the vertical direction, the gas can be quickly supplied in the overall height direction of the pre-chamber.

The pre-chamber can be provided in such a way that the pre-chamber overlaps over and deploys on the frame side wall as viewed from the side of the vehicle. In this case, the reaction force during pre-chamber deployment is applied to the frame side wall part causing reliable deployment toward the center side of the seat. Even after deployment, pressure from the occupant can be applied to the frame side wall part, enabling reliable restraining of the occupant toward the center of the seat.

Moreover, the main chamber can be configured to expand such that the main chamber does not overlap with the frame side wall part when viewed from the side of the vehicle. Here, the main chamber can be deployed quickly and smoothly without being obstructed by the side frames and pre-chamber.

Note that the side airbag device according to the present invention includes a type which is deployed on a door side (outer side) of the seat, and a type which is deployed on a vehicle center side of the seat. A side airbag device of a type which is deployed on the vehicle center side of the seat, for example, is referred to as a far side airbag, front center airbag, rear center airbag, and the like.

BRIEF DESCRIPTION OF THE DRAWINGS

FIG. 1 is a perspective view primarily illustrating the external shape of a vehicle seat used as the vehicle seat according to the present invention, with an illustration of an airbag unit omitted.

FIG. 2 is a perspective view illustrating an internal structure (seat frame) functioning as the framework of the vehicle seat illustrated in FIG. 1, with an illustration of the airbag unit omitted.

FIG. 3 is a schematic side view of the vehicle seat according to the present invention, illustrating the state in which the airbag unit is stowed when observed externally in the vehicle width direction.

FIG. 4 is a cross sectional view illustrating the structure of the vehicle seat according to the present invention, corresponding to part of a cross section in an A1-A1 direction of FIG. 3.

FIG. 5 (B) is a front view illustrating airbag deployment, viewed from the front to the rear in the direction of travel.

FIG. 7 is an explanatory diagram illustrating the panel structure that composes the pre-chamber of the airbag used in the side airbag device according to embodiment 1 of the present invention.

FIG. 9 (B) is a front view illustrating airbag deployment, viewed from the front to the rear in the direction of travel.

FIG. 11 is an explanatory diagram illustrating the panel structure that composes the pre-chamber of the airbag used in the side airbag device according to embodiment 2 of the present invention.

DESCRIPTION OF THE PREFERRED EMBODIMENT

Figure 5A:
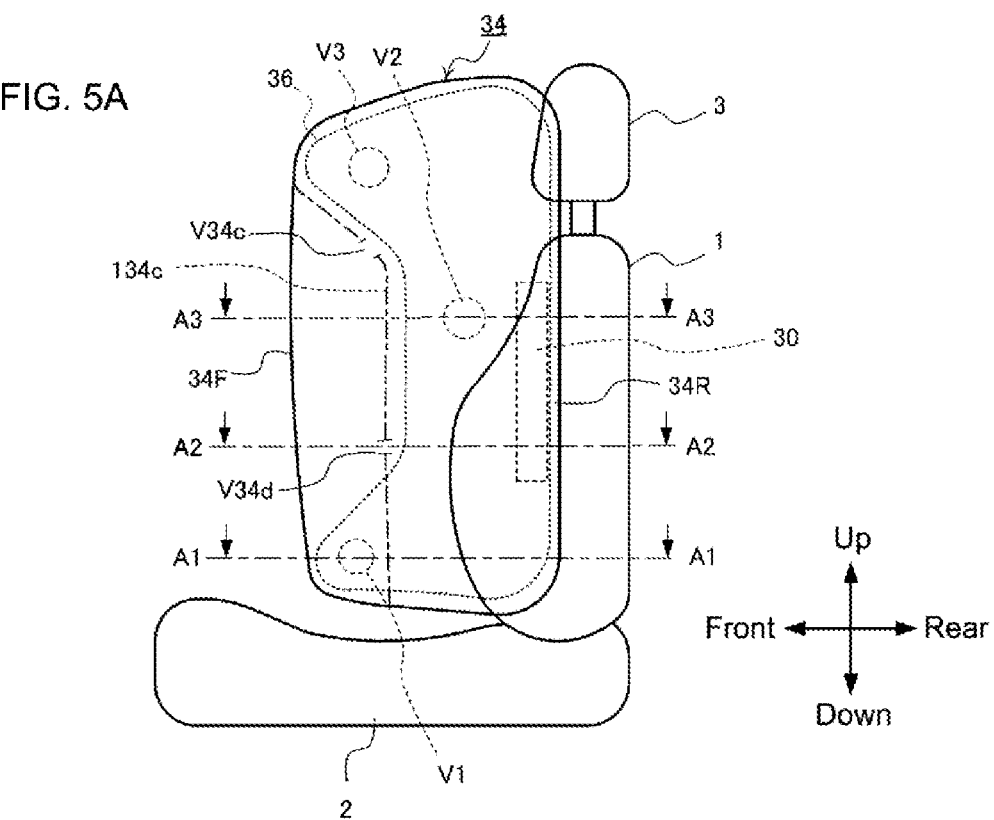
FIG. 5 (A) is a schematic side view of the vehicle seat according to embodiment 1 of the present invention, illustrating the state in which the airbag is deployed when observed externally in the vehicle width direction (opposite side of the occupant).

The vehicle seat with the side airbag device according to the embodiments of the present invention mounted thereon will be described with reference to the accompanying drawings. Note that when an occupant is seated in a normal seating posture such that a large portion of the back of the passenger contacts the seat back, a direction that the torso of the passenger faces shall be referred to as "front", and an opposite direction thereof shall be referred to as "rear".

Furthermore, a right-hand direction of the occupant shall be referred to as "right", and a left-hand direction shall be referred to as "left", which are directions orthogonal to the front-rear direction. In the left-right direction, a region on an occupant side from a side frame of the seat shall be referred to as "inside", and a region opposite from the occupant as viewed from the side frame shall be referred to as "outside".

FIG. 1 is a perspective view primarily illustrating the external shape of the vehicle seat according to the present invention, where an airbag device (20) is not illustrated. FIG. 2 is a perspective view illustrating an internal structure (seat frame) functioning as a framework of the vehicle seat illustrated in FIG. 1, with an illustration of the airbag device (20) also omitted herein. FIG. 3 is a schematic side view of the vehicle seat according to the present invention, illustrating a view of the airbag device 20 stowed on the side (near side) near the door of the vehicle seat as observed externally in the vehicle width direction.

The present invention is a vehicle seat equipped with a vehicle seat main body and a side airbag device (20) stowed in the seat. The vehicle seat main body according to the present embodiment, when viewed as a part, includes a seat cushion 2 for the portion of the seat on which an occupant sits, a seat back 1 forming a backrest, and a headrest 3 connected to the upper end of the seat back 1, as illustrated in FIG. 1 and FIG. 2.

A seat back frame 1f forming the skeleton of the seat is provided inside the seat back 1, while a pad made of a urethane foaming material, etc. is provided on the surface and periphery thereof, and the surface of this pad is covered with a skin 14 such as leather or fabric. A seating frame 2f is arranged on the bottom side of the seat cushion 2, while a pad made of a urethane foaming material, etc. is provided on the upper surface and periphery thereof, and the surface of this pad is covered with a skin 14 (FIG. 4) such as leather or fabric. The seating frame 2f and the seat back frame 1f are connected via a reclining mechanism 4.

As illustrated in FIG. 2, the seat back frame 1f is configured in a frame shape by: a side frame 10 arranged so as to be separated into the left and right and extending in a vertical direction; an upper frame connected to an upper end part of the side frame 10; and a lower frame connected to a lower end part thereof. A cushion member is provided outside a headrest frame to configure the headrest 3.

FIG. 4 is a cross sectional view illustrating the structure of the vehicle seat according to the present invention, corresponding to a part of a cross section in an A1-A1 direction of FIG. 3. The side frame 10 can be molded of resin or metal and, as illustrated in FIG. 4, can be formed into an L-shaped cross sectional shape or a U-shaped cross sectional shape. The side frame 10 includes a frame side wall part 10a extending in the vehicle traveling direction when the horizontal cross section is seen from above. Furthermore, the airbag module (side airbag device) 20 is secured on an inner side (seat center side) of the frame side wall part 10a.

As illustrated in FIG. 4, the seat back 1 includes a side supporting part 12 which swells in the vehicle traveling direction (vehicle front) on a vehicle width direction side part (end part). Inside the side support part 12, the side airbag apparatus 20 is housed in a gap without a urethane pad 16 arranged therein. The side airbag device 20 is provided with airbags (34, 36) that restrain an occupant by inflating and expanding, and an inflator 30 that supplies expanding gas to the airbags (34, 36).

Seams 18, 22, 24 of the skin 14 of the seat back 1 are interwoven and connected by sewing. Note that the front seam 18 is cleft when the airbag is deployed. In addition, the side support part 12 is formed with a start region 26 which is the starting point for the side support part 12 when bending toward the passenger side based on expansion of the pre-chamber 36 (see FIG. 5 and FIG. 6). The start region 26 can be any one of a notch, recess, or thin region, or combinations thereof. The start region 26 may be formed at only a urethane 16 part inside the side supporting part 12. Furthermore, the start region 26 can be omitted.

The airbags (34, 36) are covered by a flexible cover 20a made of fabric. Regarding the relationship between the main chamber 34 and the pre-chamber 36, the airbags (34, 36) can be folded or rolled into a bellows shape ("folding" includes rolling) and other optimal compression methods can be employed as appropriate. In FIG. 4, the symbol 25 denotes a door trim. Although not illustrated, the pre-chamber and the main chamber are folded integrally with the pre-chamber and the main chamber overlapping in a flat and unfolded state. Therefore, when the airbag is folded and stowed, the position of the airbag during expansion and deployment can be properly maintained. On the other hand, if the pre-chamber and main chamber are individually folded, the folded pre-chamber part may be arranged in a position closer to the inflator than the folded main chamber part, or may be arranged between the folded main chamber portion and the side frame. In other words, the folded pre-chamber may be arranged on the occupant's side with respect to the folded main chamber.

Figure 5B:
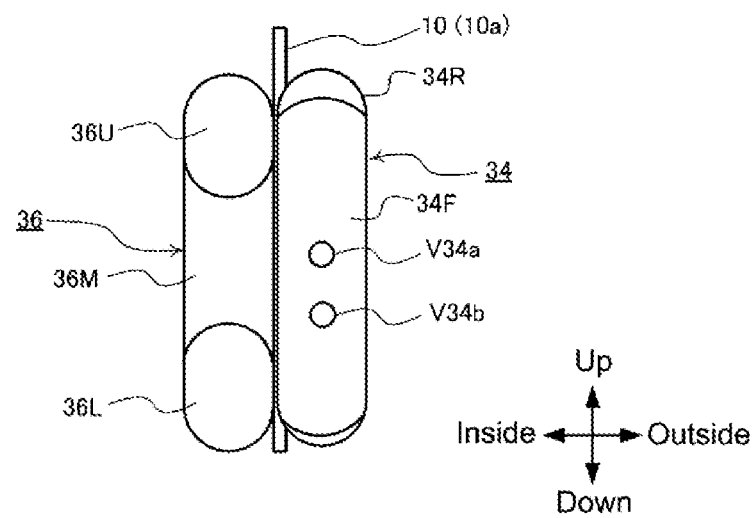

FIG. 5 (A) is a schematic side view of the vehicle seat according to embodiment 1 of the present invention, illustrating a view of the airbags (34, 36) deployed as observed externally in the vehicle width direction (opposite to the occupant). FIG. 5 (B) is a front view of the airbags (34, 36) deployed, illustrating a view from the front of the vehicle.

Figure 6C:
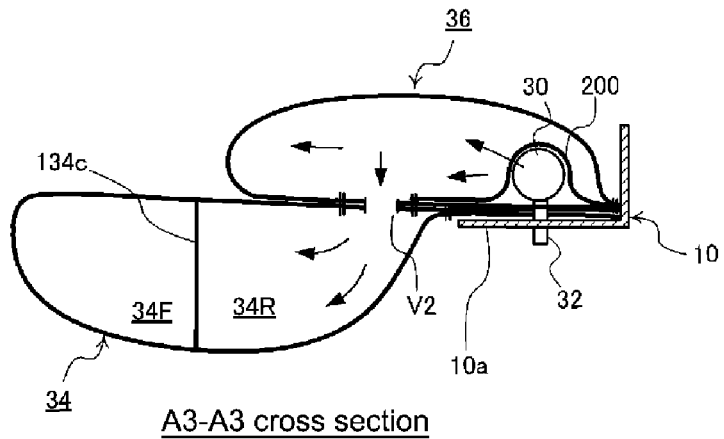
FIG. 6 shows cross-sectional views of the structure of the airbag device according to embodiment 1 of the present invention, where cross-sections are taken as follows: (A) in the A1-A1 direction of FIG. 5 (A), (B) in the A2-A2 direction of FIGS. 5 (A), and (C) in the A3-A3 direction of FIG. 5 (A).
Figure 6B:
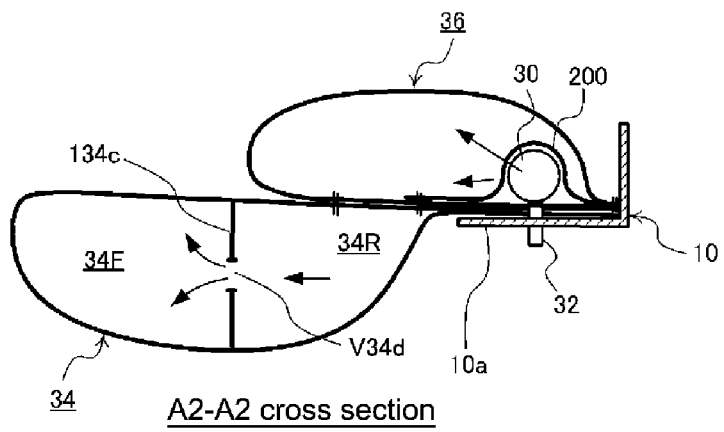
Figure 6A:
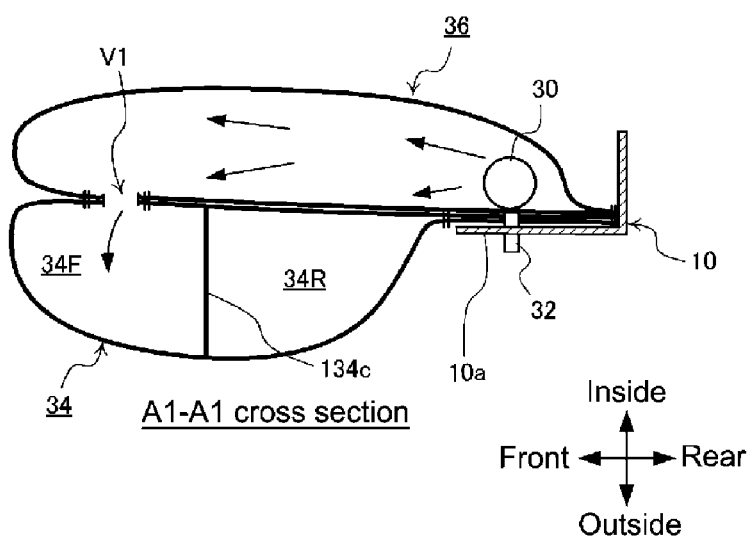

FIG. 6 shows cross-sectional views of the structure of the airbag device according to embodiment 1 of the present invention, where cross-sections are taken as follows: (A) in the A1-A1 direction of FIG. 5 (A), (B) in the A2-A2 direction of FIGS. 5 (A), and (C) in the A3-A3 direction of FIG. 5 (A).

As illustrated in FIG. 5 (A), the airbags (34, 36) are provided with a main chamber 34 that deploys toward the front of the side support part 12, and a pre-chamber 36 that deploys to the inside of the main chamber 34 in the width direction of the vehicle.

The main chamber 34 is partitioned by a baffle plate 134c into a relatively small volume forward chamber 34F that is positioned forward, and a rear chamber 34R, positioned rearward, with a larger volume than the forward chamber 34F. As illustrated in FIG. 6 (B), the forward chamber 34F and the rear chamber 34R are fluidly connected to the forward chamber 34F and the rear chamber 34R by inner vents V34c and V34d formed on the baffle plate 134c, allowing expanding gas to flow from the rear chamber 34R to the forward chamber 34F. As illustrated in FIG. 5 (B), exhaust vents V34a and V34b are provided at the front end of the forward chamber 34F to exhaust the gas externally.

As illustrated in FIGS. 6 (A), (B), and (C), the airbags (34, 36) include the main chamber 34 that deploys toward the front of the side support part 12 of the seat, and the pre-chamber 36 that houses the inflator 30 and begins to deploy prior to the main chamber 34 to the inside of the main chamber 34 in the vehicle width direction. As illustrated in FIGS. 5 (A) and 6 (A) and (B), the partitioning part (boundary area) between the main chamber 34 and the pre-chamber 36 is provided with inner vents V1, V2, and V3 that allow expanding gas to flow from the pre-chamber 36 to the main chamber 34.

Regarding the present embodiment, a tubular rectifying member 200, for example, which surrounds the inflator 30 and regulates the flow of the expanding gas, is provided inside the pre-chamber 36. This allows for control of the flow of expanding gas into the pre-chamber 36. Further, openings are provided at the top and bottom ends of the rectifying member 200 to guide the gas released from the inflator 30 up and down in the upper region 36U and lower region 36L of the pre-chamber 36, allowing the gas to be supplied to the upper and lower regions of the pre-chamber 36 quickly.

As illustrated in FIGS. 6 (A), (B), and (C), the pre-chamber 36 is basically deployed in a manner causing overlapping of the frame side wall 10a as viewed from the side of the vehicle. As the pre-chamber 36 is deployed in such a manner causing overlapping of the frame side wall 10a, the reaction force when the pre-chamber 36 is deployed is applied to the frame side wall 10a, and the pre-chamber 36 can be reliably deployed toward the center of the seat. Even after deployment, pressure from the occupant can be received by the frame side wall part 10a, and thus the occupant can be reliably restrained in the seat center direction.

On the other hand, the main chamber 34 is deployed in a manner that does not overlap the side walls of the frame as viewed from the side of the vehicle. This allows the main chamber 34 to be deployed quickly and smoothly without being obstructed by the side frame 10 or the pre-chamber 36.

Referring back to FIG. 5, the pre-chamber 36 is shaped with the upper portion and lower portion protruding forward. In the present embodiment, the pre-chamber 36 can be given a backward C-shape or a forward C-shape with the middle region recessed rearwardly when viewed from the side of the occupant. When the airbag is deployed, the upper region of the pre-chamber 36 is positioned near the head of the occupant, and the head, which is prone to injury, can be quickly restrained. In addition, the lower region is positioned near the waist of the occupant and presses on the waist close to the center of gravity of the human body, thereby improving occupant restraint performance in the early stages of an accident.

The front end of the pre-chamber 36 is molded to roughly match the position of the front end of the main chamber 34. In this case, the airbag, including the main chamber 34 and the pre-chamber 36, has the advantage of having an integrated structure and an overall stable deployment shape.

FIG. 7 is an explanatory diagram illustrating the panel structure composing the pre-chamber 36. The pre-chamber 36 can be prepared by overlapping two panels 136a and 136b of the same shape and sewing the perimeter thereof.

Regarding the pre-chamber 36, one front vent V1a and two rear vents V2a and V3a are formed on an outer panel 136b, which is joined to the main chamber 34. The front vent V1a is connected to the front chamber 34F of the main chamber 34 as described below, and the rear vents V2a and V3a are connected to the rear chamber 34R.

In FIG. 7, S1 and S2 illustrate the sewing areas with the main chamber 34. The sewing area S1 is circular in shape surrounding the front vent V1a. The sewing area S2 is oblong in order to surround the rear vents V2a and V3a. The area connecting the main chamber 34 to the pre-chamber 36 by sewing is basically just around the front/rear vents V1a, V1b, and V1c, and does not have to be any larger than necessary.

Figure 8A:
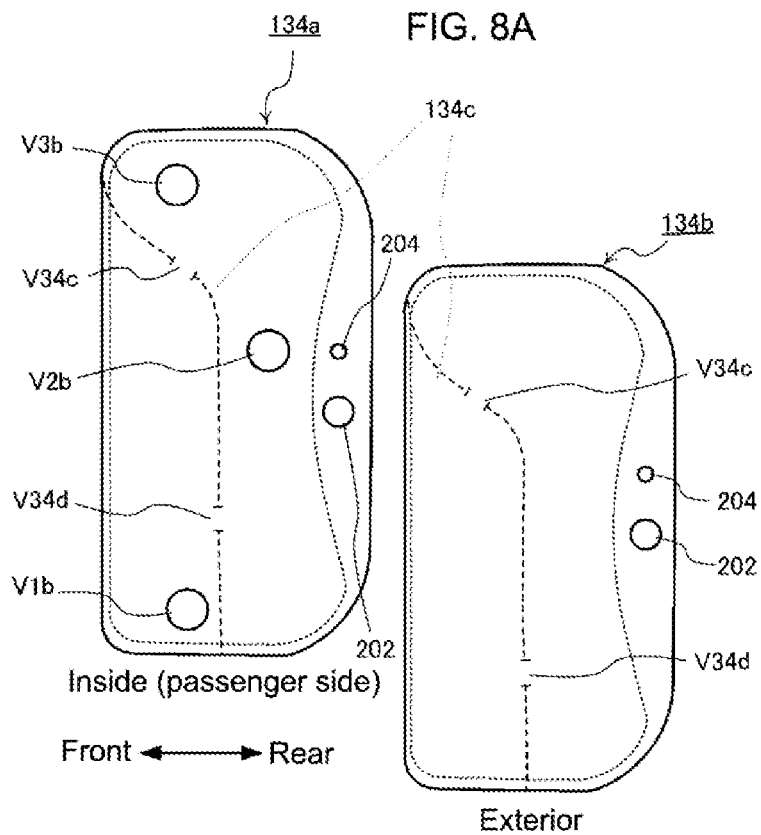
FIGS. 8 (A) and (B) are explanatory diagrams illustrating the panel structure that compose the main chamber of the airbag used in the side airbag device according to embodiment 1 of the present invention.
Figure 8B:
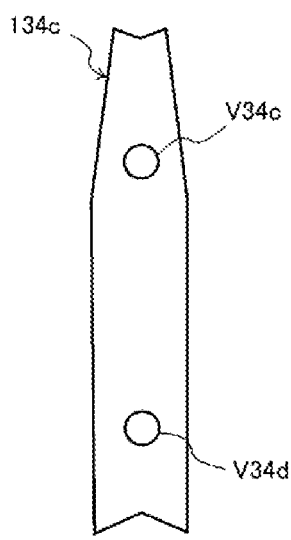

FIGS. 8 (A) and (B) are explanatory diagrams illustrating the panel structure that configure the main chamber 34 of the airbag used in the side airbag device according to embodiment 1 of the present invention. The main chamber 34 can be prepared by overlapping two panels 134a and 134b of the same shape and sewing the perimeter thereof. Furthermore, one front vent V1b and two rear vents V2b and V3b are formed on an inner panel 134a, which is connected to the pre-chamber 36. These vents V1b, V2b, and V3b correspond to the vents V1a, V2a, and V3a (see FIG. 7) of the pre-chamber 36, respectively, and the internal vents V1, V2, and V3 (see FIG. 5 (A)) are formed by sewing (S1, S2) around the overlapped openings.

As already described in the description of FIG. 5, a baffle plate 134c that extends in the vertical direction is connected to the portions of the two panels 136a and 136b indicated by the dashed lines. This allows the main chamber 34 to be partitioned into a front chamber 34F and a rear chamber 34R, as illustrated in FIG. 5 and FIG. 6. Two baffle vents V34c, V34d are provided on the baffle plate 134c, allowing gas to flow from the rear chamber 34R to the front chamber 34F through these vents.

Regarding the present embodiment, the front vent V1b is positioned in front of the baffle plate 134c, or in other words on the front chamber 34F side, and the rear vents V2b and V3b are positioned behind the baffle plate 134c, or in other words on the rear chamber 34F side. As mentioned above, the tubular rectifying member 200 (see FIGS. 6 and 7) allows the gas from the inflator 30 to be quickly supplied to the upper region 36U and the lower region 36L of the pre-chamber 36 during initial deployment. The front vent V1 is positioned in the vicinity of precisely where gas is first supplied in the lower region 36L. The rear vent V3 is positioned in the vicinity of precisely where gas is first supplied in the upper region 36U. This vent position is beneficial in causing gas to be supplied quickly into the pre-chamber 36 and causing the pre-chamber 36 to deploy, and at the same time, gas will enter the vicinity of the occupant's shoulders and lumbar area, which are the areas where the main chamber 34 preferably provides restraint earlier, so that the restraint in these areas begins during initial deployment.

In FIG. 7 and FIG. 8, symbol 202 denotes an opening for inserting a tubular inflator 30, and the inflator 30 is arranged to extend in the vertical direction. The symbol 204 denotes a hole through which the stud bolt 32 for securing the inflator 30 passes.

Figure 9A:
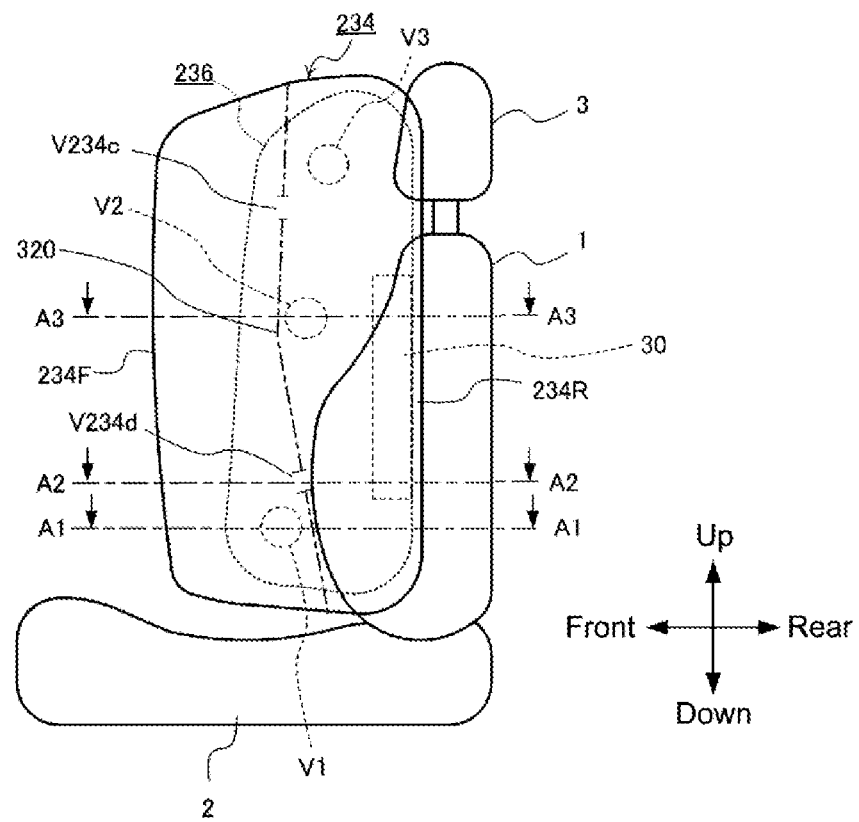
FIG. 9 (A) is a schematic side view of the vehicle seat according to embodiment 2 of the present invention, illustrating the state in which the airbag is deployed when observed externally in the vehicle width direction (opposite side of the occupant).
Figure 9B:
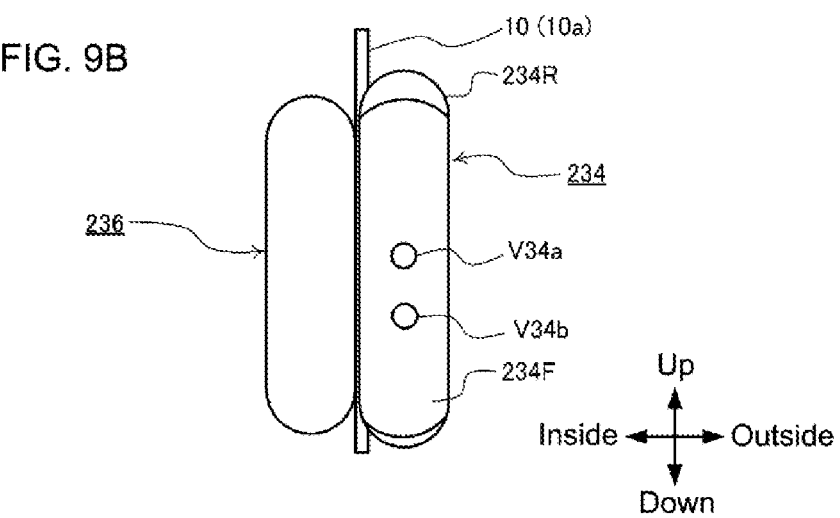
Figure 10C:
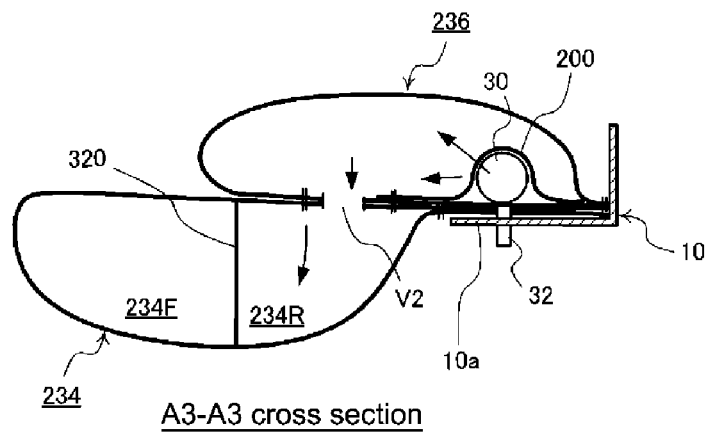
FIG. 10 shows cross-sectional views of the structure of the airbag device according to embodiment 2 of the present invention, where cross-sections are taken as follows: (A) in the A1-A1 direction of FIG. 9 (A), (B) in the A2-A2 direction of FIGS. 9 (A), and (C) in the A3-A3 direction of FIG. 9 (A).
Figure 10B:
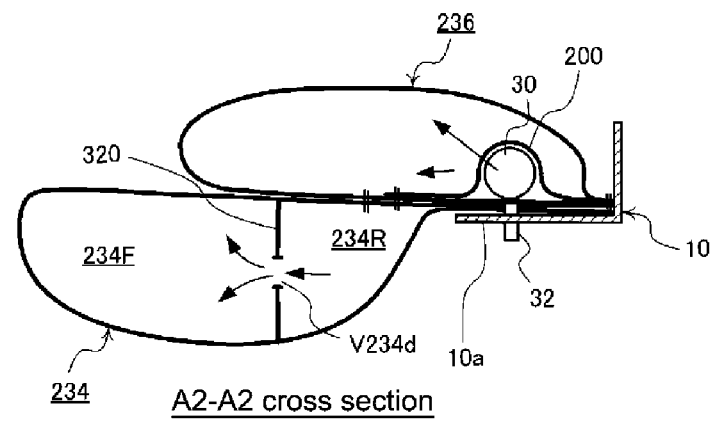
Figure 10A:
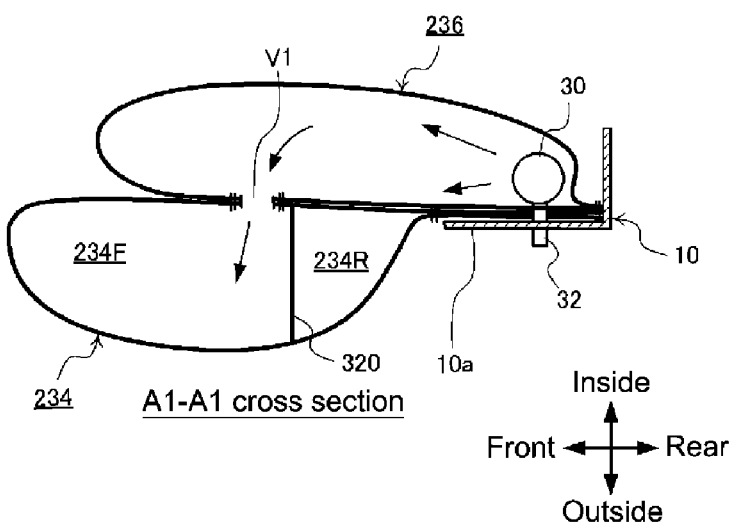

FIG. 9 (A) is a schematic side view of a vehicle seat according to embodiment 2 of the present invention, illustrating a view of the airbags (234, 236) deployed as observed externally in the vehicle width direction (opposite of the occupant). FIG. 9 (B) is a front view of the airbags (234, 236) deployed, viewed from the front to the rear of the direction of travel. FIG. 10 is cross-sectional views of the structure of the airbag device according to embodiment 2 of the present invention, where cross-sections are taken as follows: (A) in the A1-A1 direction of FIG. 9 (A), (B) in the A2-A2 direction of FIGS. 9 (A), and (C) in the A3-A3 direction of FIG. 9 (A).

With respect to embodiment 2 of the present invention described below, members common to or equivalent to embodiment 1 described above are given the same symbols and duplicate explanations shall be omitted as much as possible. In other words, embodiment 2 will be explained mainly in terms of the differences from embodiment 1.

The main differences between the present embodiment and embodiment 1 as described above are the shape of the pre-chamber 236 and the configuration of the main chamber 234, including the shape of the baffle plate 320. The pre-chamber 236 used in the present embodiment is generally trapezoidal in shape, with a slightly narrower upper front-rear width and widest at the lower end. The shape of the baffle plate 320 is the same as in embodiment 1, with regards to demarcation of the front vent V1 and the rear vents V2 and V3. The baffle plate 320 has vent holes V234c and V234d that provide fluid connection between the forward chamber 234F and the rear chamber 234R.

Figure 12A:
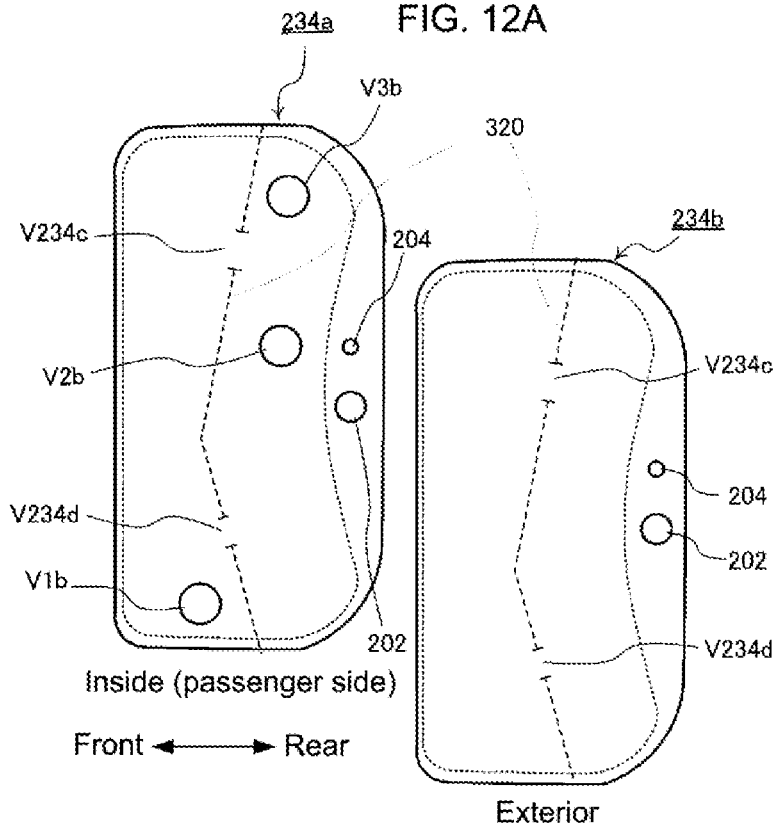
FIGS. 12 (A) and (B) are explanatory diagrams illustrating the panel structure that configure the main chamber of the airbag used in the side airbag device according to embodiment 2 of the present invention.
Figure 12B:
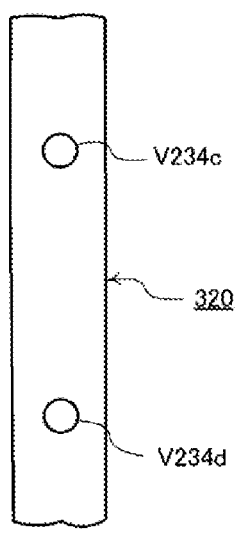

FIG. 11 is an explanatory diagram illustrating the panel structure that makes up the pre-chamber 236 of the airbag used in the side airbag device according to embodiment 2 of the present invention. In addition, FIG. 12 (A), (B) are explanatory diagrams illustrating the panel structure that make up the main chamber 234 of the airbag used in the side airbag device according to embodiment 2 of the present invention.

Regarding the pre-chamber 236, one front vent Via and two rear vents V2a and V3a are formed on an outer panel 236b, which is connected to the main chamber 234. The front vent V1a is connected to the front chamber 234F of the main chamber 234, described below, and the rear vents V2a, V3a are connected to the rear chamber 234R.

In FIG. 11, S1 and S2 illustrate the sewing areas with the main chamber 234. The sewing area S1 is circular in shape surrounding the front vent V1a. The sewing area S2 is oblong in order to surround the rear vents V2a and V3a. The area connecting the main chamber 234 to the pre-chamber 236 by sewing is basically just around the front/rear vents V1a, V1b, and V1c, and does not have to be any larger than necessary.

The main chamber 234 can be made by overlapping two panels 234a, 234b of the same shape and sewing the perimeter thereof. Furthermore, one front vent V1b and two rear vents V2b and V3b are formed on panel 234a to the inside and connected to the pre-chamber 236. These vents V1b, V2b, and V3b correspond to the vent openings V1a, V2a, and V3a (see FIG. 7) of the pre-chamber 236, respectively, and the internal vents V1, V2, and V3 (see FIG. 9 (A)) are formed by sewing (S1, S2) around the overlapped openings.

A baffle plate 320 that extends in the vertical direction is connected to the portions of the two panels 236a and 236b indicated by the dashed lines. This allows the main chamber 234 to be partitioned into a front chamber 234F and a rear chamber 234R, as illustrated in FIG. 9 and FIG. 10. In a similar manner to embodiment 1, two baffle vents V234c and V234d are provided on the baffle plate 320, allowing gas to flow from the rear chamber 234R to the front chamber 234F through these vents.

Regarding the present embodiment, the front vent V1b is positioned in front of the baffle plate 320, or in other words on the front chamber 234F side, and the rear vents V2b and V3b are positioned behind the baffle plate 320, or in other words on the rear chamber 234F side.

Figure 13A:
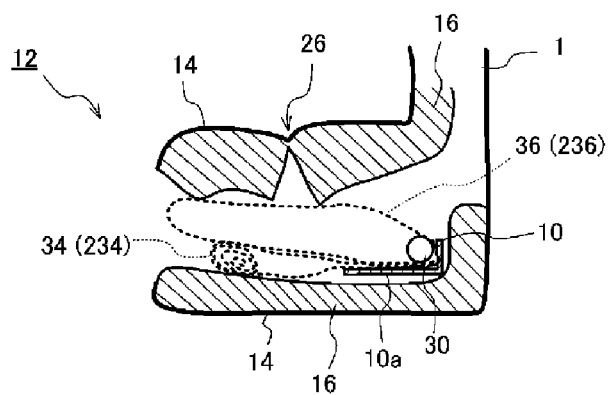
FIG. 13 is an explanatory diagram (cross-sectional view) illustrating the deployment of the airbag device according to embodiment 1 and embodiment 2 of the present invention, where (A) illustrates initial deployment and (B) illustrates the later stages of deployment.
Figure 13B:
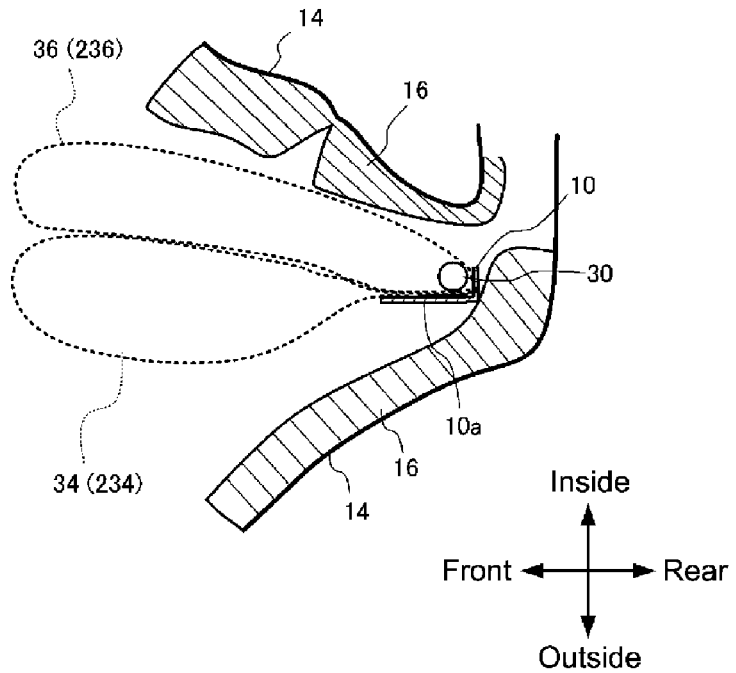

FIG. 13 is an explanatory diagram (cross-sectional view) illustrating the deployment of the airbag device according to embodiment 1 and embodiment 2 of the present invention, where (A) illustrates initial deployment and (B) illustrates the later stages of deployment. As illustrated in FIG. 13 (A), regarding the present invention (embodiment 1 and embodiment 2) with the above configuration, the pre-chamber 36 (236) unfolds inside the side support part 12 during the early stages of operation of the airbag device 20, deforms such that the tip of the side support part 12 bends or protrudes on the vehicle side starting from the region 26 while the seat cover 14 tears starting at the sewn part 18, and restrains so as to push the occupant to the inside in the vehicle width direction.

Deployment of the pre-chamber 236 causes the front side part of the side support part 12 to protrude toward the occupant side, thereby avoiding or minimizing the generation of forces that would push the occupant diagonally forward from the direction of the back of their body, thereby avoiding movement of the occupant in the direction that the seatbelt is pulled out. In other words, injury to the occupant can be suppressed, and restraining performance can be maximized.

Subsequently, as illustrated in FIG. 13 (B), when the airbags (234, 236) are further inflated, the main chamber 234 fully deploys toward the front of the vehicle to protect the occupants in the event of a collision.

While the present invention has been described with reference to the abovementioned illustrative embodiments, many equivalent changes and variations will be obvious to those skilled in the art from the present disclosure. Therefore, the abovementioned illustrative embodiments of the present invention are presumably illustrative but not limiting. Without departing from the spirit and scope of the present invention, the described embodiments may take on various modifications. For example, while a side airbag on the near side has been predominantly mentioned in the Description of the Preferred Embodiment, use is also possible with a far side airbag (surface on the far side from a vehicle door of a vehicle seat), in very small vehicles such as a single seat vehicle (irrespective of the presence of a door, a vehicle including parts with only one seat in a single row), and the like.

The invention claimed is:

1. A side airbag device comprising:
   an inflator that produces expanding gas; and
   an airbag that deploys from a side part of a vehicle seat of a vehicle from the expanding gas to protect an occupant,
   wherein the airbag comprises a main chamber for deployment toward a front of the vehicle and a pre-chamber that houses the inflator and begins expansion before the main chamber to an inside in a vehicle width direction from the main chamber, the main chamber is demarcated into a forward region and a rear region by a demarcation, the airbag including a front vent for guiding the expanding gas from the pre-chamber to a forward region of the main chamber and a rear vent for guiding the expanding gas from the pre-chamber to the rear region of the main chamber, the front and rear vents provided on a boundary area of the main chamber and the pre-chamber.

2. The side airbag device according to claim 1, wherein the pre-chamber deploys to cover at least a portion of the forward and rear regions of the main chamber in a side direction.

3. The side airbag device according to claim 1, wherein the pre-chamber includes a downward protruding part on a lower side, the downward protruding part protruding in a forward direction and positioned more to a rear side of the vehicle than a front end part of the main chamber.

4. The side airbag device according to claim 1, wherein the pre-chamber includes an upper protruding part on an upper side and protruding toward a front of the vehicle, and which is positioned more to a rear side of the vehicle than a front end part of the main chamber.

5. The side airbag device according to claim 1, wherein the rear vent is formed in at least two locations.

6. The side airbag device according to claim 1, wherein the rear vent is formed above a middle portion of the pre-chamber in a height direction.

7. The side airbag device according to claim 6, wherein the front vent is formed below the middle portion of the pre-chamber in the height direction.

8. The side airbag device according to claim 1, wherein for the main chamber, the forward region and the rear region are partitioned by a baffle plate.

9. The side airbag device according to claim 8, wherein for the main chamber, the baffle plate is provided with a baffle vent that fluidly connects the forward region and the rear region.

10. The side airbag device according to claim 1, wherein a rectifying member is further provided that surrounds the inflator inside the pre-chamber and regulates a flow of expanding gas.

11. The side airbag device according to claim 10, wherein the rectifying member is provided with openings at an upper end part and a lower end part that guide the expanding gas released from the inflator in a vertical direction.

12. The side airbag device according to claim 1, wherein the pre-chamber is configured to deploy so as to overlap on a frame side wall part in a side direction.

13. The side airbag device according to claim 1, wherein the main chamber is configured to deploy without overlapping a frame side wall part in a side direction.

14. A vehicle seat comprising the side airbag device according to claim 1.

* * * * *